(12) United States Patent
Zhuang et al.

(10) Patent No.: US 10,038,615 B1
(45) Date of Patent: Jul. 31, 2018

(54) PROVIDING METRIC DATA FOR A DATA STORAGE SYSTEM THROUGH A REPRESENTATIONAL STATE TRANSFER (RESTFUL) APPLICATION PROGRAMMING INTERFACE (API)

(71) Applicant: EMC Corporation, Hopkinton, MA (US)

(72) Inventors: Pei Yu Zhuang, Shanghai (CN); Amr H. Mohamed, Raleigh, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 380 days.

(21) Appl. No.: 14/867,389

(22) Filed: Sep. 28, 2015

(51) Int. Cl.
*G06F 17/30* (2006.01)
*H04L 12/26* (2006.01)

(52) U.S. Cl.
CPC .... *H04L 43/0888* (2013.01); *G06F 17/30327* (2013.01); *G06F 17/30598* (2013.01); *G06F 17/30876* (2013.01); *H04L 43/065* (2013.01)

(58) Field of Classification Search
None
See application file for complete search history.

(56) References Cited

U.S. PATENT DOCUMENTS

| | | | |
|---|---|---|---|
| 7,069,512 B2 | 6/2006 | Harvey et al. | |
| 7,805,510 B2* | 9/2010 | Bansal | H04L 67/22 709/224 |
| 8,180,690 B2* | 5/2012 | Mayle | G06Q 30/0641 705/27.1 |
| 8,578,021 B2 | 11/2013 | Bellomie | |
| 8,744,980 B2 | 6/2014 | Petrick | |
| 8,745,214 B2* | 6/2014 | Inamdar | G06F 11/3404 709/224 |
| 9,185,188 B1* | 11/2015 | Li | G06F 9/46 |
| 9,304,702 B2* | 4/2016 | Truong | G06F 3/0626 |
| 9,514,027 B2* | 12/2016 | Shen | G06F 8/77 |
| 9,836,480 B2* | 12/2017 | Okun | G06F 17/30221 |
| 2007/0266045 A1* | 11/2007 | Bansal | H04L 67/22 |

* cited by examiner

*Primary Examiner* — Debbie Le
(74) *Attorney, Agent, or Firm* — BainwoodHuang

(57) ABSTRACT

A data storage system stores historical statistical data in a statistics hierarchy that is a tree of nodes. The data storage system receives a metric request from a remote requesting device through a Representational State Transfer (RESTful) Application Programming Interface (API), including a metric path that is a delimited list of list elements separated by delimiter characters. In response to an aggregation special character in the metric path, the data storage system i) obtains a category name immediately preceding the aggregation special character in the metric path, ii) identifies a branch of the statistics hierarchy indicated by the category name, iii) aggregates values of leaf nodes contained in the branch of the statistics hierarchy indicated by the category name that match a leaf type in the metric path to generate an aggregated value, and iv) transmits a metric response containing the aggregated value to the remote requesting device.

16 Claims, 8 Drawing Sheets

PROVIDING METRIC DATA FOR A DATA STORAGE SYSTEM THROUGH A REPRESENTATIONAL STATE TRANSFER (RESTFUL) APPLICATION PROGRAMMING INTERFACE (API)

BACKGROUND

Data storage systems are arrangements of hardware and software that include one or more storage processors coupled to arrays of non-volatile storage devices, such as magnetic disk drives, electronic flash drives, and/or optical drives, for example. The storage processors service storage requests, typically arriving from host machines ("hosts"), which may, for example, specify files or other data elements to be written, read, created, or deleted. Software running on the storage processors manages incoming storage requests and performs various data processing tasks to organize and secure the data elements stored on the non-volatile storage devices.

It is often desirable to obtain statistical data regarding the operation of a data storage system. For example, a system administrator may need statistical data describing the performance of the data storage system over a preceding period of time, in order to determine whether the data storage system has been providing acceptable performance, and/or to troubleshoot performance problems.

SUMMARY

Previous approaches to providing statistical data from data storage systems have exhibited significant shortcomings. In some previous data storage systems, a command line interface (CLI) has been provided to receive requests for statistical data. However, because CLI interfaces are generally designed to be used locally, they introduce complexity when they must be used from a remote system. Also, CLI interfaces in previous systems have provided unstructured text as an output, and accordingly their output has required parsing before it could be used. In addition, the unstructured text output provided by previous CLI interfaces is not convenient for use by scripts that are used to perform various aspects of system management. As scripts become more and more frequently used to automate the execution of tasks that would alternatively be executed one-by-one by a human operator, this limitation has become increasingly significant. Previous interfaces for obtaining statistical data from data storage systems have also lacked flexibility with regard to aggregation versus breakdown ("break-by") options. In particular, some previous interfaces have not allowed convenient access to an aggregation of values represented by many elements in a set.

To address the above described and other shortcomings of previous solutions, a new system is disclosed for providing access to statistical data of a data storage system. In the disclosed system, historical statistical data describing previous operation of the data storage system is collected by the data storage system, and stored in a statistics hierarchy that is a tree of nodes. The data storage system receives a metric request from a remote device through a Representational State Transfer (RESTful) Application Programming Interface (API) provided by the data storage system. The metric request includes a metric path that is a delimited list made up of list elements separated by delimiter characters (e.g. a text string consisting of text list elements separated by periods). The processing of the received metric request in the data storage system may include detecting an aggregation special character in the metric path, and in response to detecting the aggregation special character in the metric path, i) obtaining a category name immediately preceding the aggregation special character in the metric path, ii) identifying a branch of the statistics hierarchy indicated by the category name, iii) aggregating the values of those leaf nodes contained in the branch of the statistics hierarchy indicated by the category name that also match a leaf type contained in the metric path, in order to generate an aggregated value, and iv) transmitting a metric response containing the aggregated value to the remote requesting device.

In another aspect of the disclosed system, each leaf node may indicate a method in which a value of the leaf node is to be aggregated with values of other leaf nodes of the same leaf type. For example, each leaf node may indicate a specific method in which the value of the leaf node is to be aggregated with the values of other leaf nodes of the same type, e.g. by summing or by averaging. Processing of the received metric request in response to detecting the aggregation special character may further include detecting that the values of those leaf nodes that i) are contained in the branch of the statistics hierarchy indicated by the category name, and ii) that also match a leaf type contained in the metric path, are to be aggregated by summing. Aggregating the values of those leaf nodes that i) are contained in the branch of the statistics hierarchy indicated by the category name, and ii) that also match the leaf type contained in the metric path, may accordingly include summing the values of those leaf nodes that i) are contained in the branch of the statistics hierarchy indicated by the category name, and ii) that also match the leaf type contained in the metric path, in order to generate the aggregated value.

In another aspect of the disclosed system, processing the received metric request in response to detecting the aggregation special character may further include detecting that the values of those leaf nodes that i) are contained in the branch of the statistics hierarchy indicated by the category name, and ii) that also match a leaf type contained in the metric path, are to be aggregated by averaging. Aggregating the values of those leaf nodes that i) are contained in the branch of the statistics hierarchy indicated by the category name, and ii) that also match the leaf type contained in the metric path, may accordingly include averaging the values of those leaf nodes that i) are contained in the branch of the statistics hierarchy indicated by the category name, and ii) that also match the leaf type contained in the metric path, in order to generate the aggregated value.

In another aspect of the disclosed system, processing the received metric request in the data storage system may include detecting a list special character in the metric path and, in response to detecting the list special character in the metric path, i) obtaining a category name immediately preceding the list special character in the metric path, ii) identifying a branch of the statistics hierarchy indicated by the category name, iii) storing a value of each leaf node contained in the branch of the statistics hierarchy indicated by the category name, and that also matches a leaf type contained in the metric path, into an output list, and iv) transmitting a metric response containing the output list to the remote requesting device.

In another aspect of the disclosed system, processing the received metric request in the data storage system may include detecting that the metric path ends with a list element that is a category name, and in response to detecting that the metric path ends with a category name, i) identifying a branch of the statistics hierarchy indicated by the category name, and ii) storing a value of each leaf node contained in the branch of the statistics hierarchy indicated by the category name into an output list, and iii) transmitting a metric response containing the output list to the remote requesting device.

In another aspect of the disclosed system, processing the metric request in the data storage system may include detecting that the metric path indicates at least one statistic for which historical statistical data not previously been maintained by the data storage system, and in response to detecting that the metric path indicates at least one statistic for which historical statistical data has not previously been maintained by the data storage system, i) causing the data storage system to begin to collect performance data corresponding to the statistic indicated by the metric path, ii) storing the collected performance data corresponding to the statistic indicated by the metric path in the data storage system, and iii) transmitting a metric response containing a query identifier (ID) identifying the statistic indicated by the metric path to the remote requesting device. When the data storage system receives, from the remote requesting device and through the application programming interface, another metric request including the query identifier, the data storage system transmits, to the remote requesting device, another metric response containing the collected performance data for the statistic, as identified by the query identifier.

Embodiments of the disclosed system may provide significant advantages over previous technologies. For example, in contrast to previous data storage systems that have provided a command line interface (CLI) to receive requests for statistical data, the disclosed system may be embodied to receive requests from a remote administration system through a RESTful API. Such requests may, for example, be received from the remote system in the form of HTTP (HyperText Transfer Protocol) requests. In addition, and in further contrast to previous systems that used CLI interfaces providing unstructured text as an output, embodiments of the disclosed system may advantageously provide a structured output in response to the requests received through the RESTful API, such as a JSON (JavaScript Object Notation) formatted output or the like. By providing a structured output, embodiments of the disclosed system are convenient for operational environments that use system management scripts (e.g. Peri, Python or the like) to remotely administer data storage systems.

Embodiments of the disclosed system may further improve over previous solutions in terms of providing greater flexibility with regard to aggregation versus breakdown options, and by providing more convenient access to an aggregation of values represented by many elements in a set.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It is understood that such embodiments are provided by way of example to illustrate various features and principles of the invention, and that the invention hereof is broader than the specific examples of embodiments disclosed below.

An improved technique for providing access to statistical data of a data storage system includes collecting statistical data describing previous operation (e.g. performance) of the data storage system, and storing the collected statistical data into a statistics hierarchy. In one embodiment, the statistics hierarchy is a tree of nodes. The data storage system receives a metric request from a remote device through a Representational State Transfer (RESTful) Application Programming Interface (API) provided by the data storage system. The metric request includes a metric path that is a delimited list made up of list elements separated by delimiter characters (e.g. a text string consisting of text list elements separated by periods). The processing of the received metric request in the data storage system may include detecting an aggregation special character as one of the list elements in the metric path, and, in response to detecting the aggregation special character in the metric path, i) obtaining a category name that is a list element immediately preceding the aggregation special character in the metric path, ii) identifying a branch of the statistics hierarchy indicated by the category name, iii) aggregating the values of those leaf nodes contained in the branch of the statistics hierarchy indicated by the category name that also match a leaf type contained in the metric path (e.g. as a last list element in the metric path), in order to generate an aggregated value, and iv) transmitting a metric response containing the aggregated value to the remote requesting device.

Figure 1:
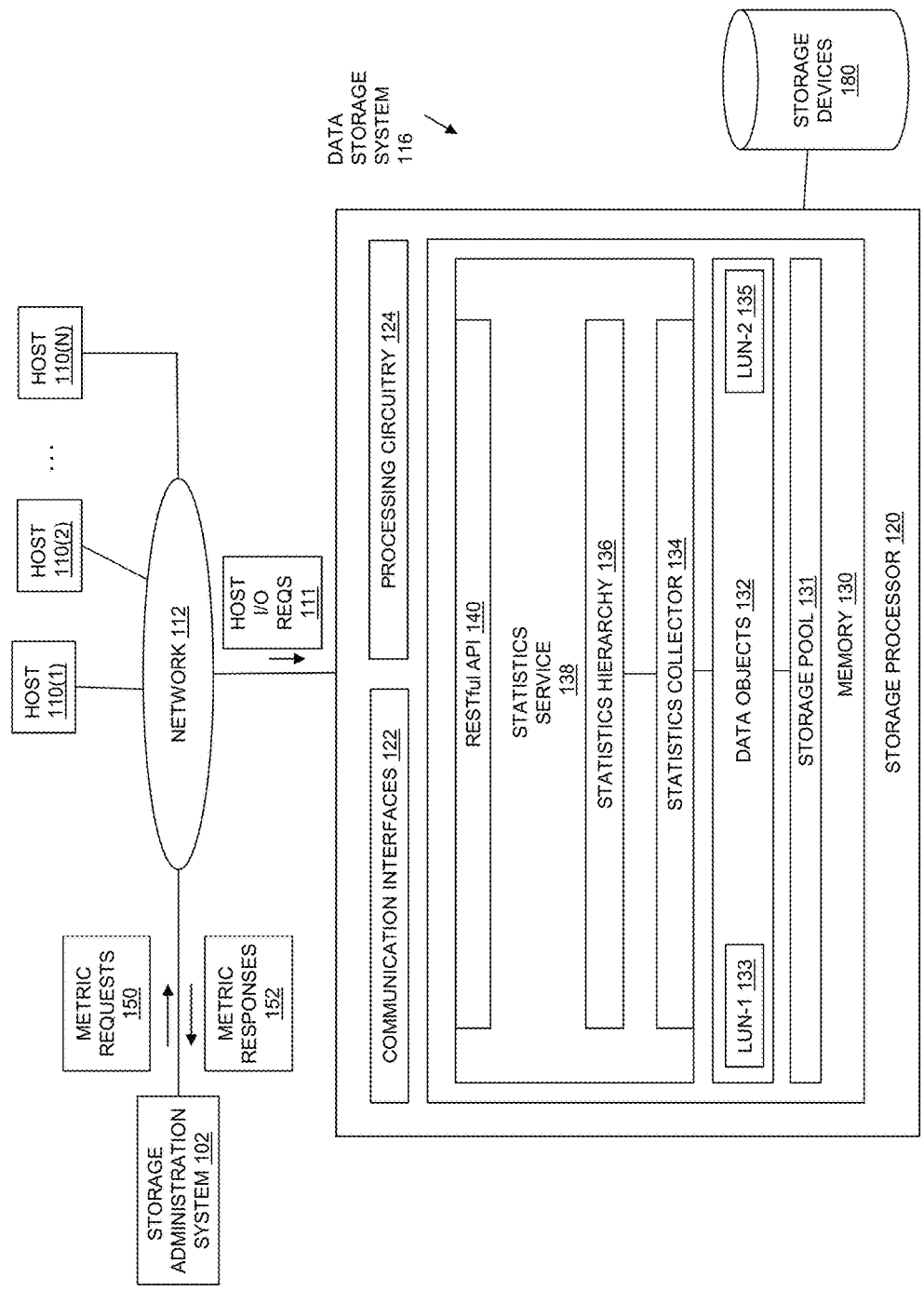
FIG. 1 is a block diagram showing a data storage system including an illustrative embodiment of the disclosed system, in an example of an operational environment in which embodiments of the disclosed system may be practiced.

FIG. 1 shows an illustrative example of an embodiment of the disclosed system, in an environment in which embodiments of the disclosed techniques may be practiced. Multiple host computing devices ("hosts"), shown as hosts 110(1) through 110(N), access a data storage system 116 over a network 112. The data storage system 116 includes a storage processor, or "SP," 120 and storage devices 180. The data storage system 116 may include multiple SPs like the SP 120. In one embodiment, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs, including a single SP, may be provided and the SP 120 can be any type of computing device capable of processing host I/Os. The storage devices 180 may, for example, may be embodied using any specific kind of data storage mechanism, including but not limited to one or more non-volatile storage devices, such as magnetic disk drives, electronic flash drives, optical drives, and/or other types of drives. Storage devices 180 may include one or more RAID groups, where each RAID group is composed of multiple disk drives.

The network 112 can be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols. As it is generally known, Fibre Channel and iSCSI are block-based protocols, whereas NFS, SMB 3.0, and CIFS are file-based protocols. The SP 120 is configured to receive and process I/O requests 111 from hosts 110(1-N), including but not limited to read and/or write I/O requests, according to block-based and/or file-based protocols, and to respond to such I/O requests by reading and/or writing the storage devices 180. Although the data storage system 116 may be capable of receiving and processing both block-based requests and file-based requests, the invention hereof is not limited to data storage systems that can do both.

The SP 120 is seen to include one or more communication interfaces 122, processing circuitry 124, and memory 130. The communication interfaces 122 include, for example, SCSI target adapters and network interface adapters for converting electronic and/or optical signals received over the network 112 to electronic form for use by the SP 120. The processing circuitry 124 includes one or more processing chips and/or assemblies. In a particular example, the processing circuitry 124 includes numerous multi-core CPUs. The memory 130 includes both volatile memory (e.g., RAM), and non-volatile memory, such as one or more ROMs, disk drives, solid state drives, and the like. The processing circuitry 124 and the memory 130 together form control circuitry, which is constructed and arranged to carry out various methods and functions as described herein. Also, the memory 130 includes a variety of software constructs realized in the form of executable instructions. When the executable instructions are run by processing circuitry 124, the processing circuitry 124 is caused to carry out the operations of the software constructs. Although certain software constructs are specifically shown and described herein, it is understood that the memory 130 typically includes many other software constructs, which are not shown, such as an operating system, and various applications, processes, and/or daemons.

The storage pool 131 in memory 130 organizes elements of storage devices 180 into units of storage used by the data storage system 116 to provide one or more storage services. For example, in one embodiment, the storage pool 131 organizes elements of storage devices 180 into "slices". A "slice" is an example of a unit of storage space (e.g. 256 megabytes or 1 gigabytes in size), which is derived from storage devices 180. The storage pool 131 allocates slices of storage devices 180 to be used by data storage system 116 to form data objects 132 that are served to the hosts 110(1-N). Each of the I/O requests 111 is directed to one of data objects 132. For example, the storage pool 131 may allocate slices to objects in data objects 132 that are served through file-based storage services, such as file systems or the like, and/or file-based virtual volumes (VVols). Alternatively, the storage pool 131 may allocate slices for objects in data objects 132 that are served through block-based storage services, such as logical disks or logical units (LUNs), and/or block-based virtual volumes (VVols). The data storage system 116 may expose the data objects 132 to hosts 110(1-N) for access by the hosts 110(1-N) in accordance with respective storage service protocols. Thus, data storage system 116 may expose block-based data objects (e.g., LUNs and/or block-based VVols) through Fiber Channel or iSCSI protocols, and/or may expose file-based objects (e.g., file systems and/or file-based VVols) using NFS, CIFS, or SMB protocols. In this way, data objects 132 that serve both file-based and block-based storage services may be built upon units of storage from storage devices 180 that are managed by the storage pool 131.

While for purposes of concise illustration only two data objects are shown in FIG. 1, i.e. LUN-1 133 and LUN-135, those skilled in the art will recognize that the disclosed system is not limited to use with any specific kind of data object, and/or to use with any specific number of data objects.

The memory 130 further includes (i.e., realizes by operation of programming code) a statistics service 138. During operation of the illustrative embodiment shown in FIG. 1, a statistics collector 134 within statistics service 138 collects statistical data describing operation of the data storage system 116. Statistical data collected by statistics collector 134 may include any specific kind of statistics regarding the operation or performance of data storage system 116. For example, statistical data collected by the statistics collector 134 may include statistics describing the rate at which host I/O operations are processed by the data storage system 116. Statistical data describing the rate at which host I/O operations are processed may be referred to as "throughput" statistics, and may be stored in terms of the number of I/O operations processed per second, or "IOPS", for each second of operation of data storage system 116. The rate at which I/O operations are processed by data storage system 116 may be collected and stored for I/O operations directed to individual ones of the data objects 132. For example, statistics collector 134 may collect and store the rate at which I/O operations directed to LUN-1 133 are processed (e.g. by collecting and storing the number of I/O operations directed to LUN-1 133 that are processed each second), and/or the rate at which I/O operations directed to LUN-2 135 are processed (e.g. by collecting and storing the number of I/O operations directed to LUN-2 135 that are processed each second), and similarly for one or more other ones of the data objects 132.

Other specific types of statistics may be collected and stored by statistics collector 134 with respect to I/O operations performed on one or more of the data objects 132. Such other specific types of statistical data may include an average size of I/O operations performed on individual ones of the data objects 132. For example, statistics collector 134 may operate to collect and store performance statistics such as the average size of the I/O operations directed to LUN-1 133 that are completed each second, and/or the average size of the I/O operations directed to LUN-2 135 that are completed each second, and similarly for one or more other ones of the data objects 132.

Alternatively, or in addition, the types of statistical data collected by statistics collector 134 may include statistics related to the performance of various components in data storage system 116 other than the data objects 132. For example, statistics collector 134 may collect historical statistics such as the percentage utilization of a CPU within processing circuitry 124 over some time period (e.g. one second), and/or the total number of bytes received and total number of bytes transmitted each second through one or more of the interfaces within communication interfaces 122.

Further during operation of the illustrative embodiment shown in FIG. 1, the statistics collector 134 stores the statistical data that it collects into a hierarchical structure, an example of which is shown for purposes of illustration in FIG. 1 by statistics hierarchy 136. Statistics hierarchy 136 is a tree of nodes. The nodes within statistics hierarchy 136 include nodes for categories, and leaf nodes that include or indicate different individual statistical values. Each category node in statistics hierarchy 136 indicates a branch of statistics hierarchy 136. In one embodiment, each category node in statistics hierarchy 136 indicates a branch of statistics hierarchy 136 consisting of those nodes in statistics hierarchy 136 located below the node in statistics hierarchy 136.

Each leaf node in statistics hierarchy 136 is a node that has no child nodes, and contains or indicates some portion of the statistical data collected by statistics collector 134, e.g. an individual item of statistical data. In one embodiment, statistics collector 134 stores individual statistics it collects into the values of the leaf nodes of statistics hierarchy 136. The type of each leaf node in statistics hierarchy 136 may indicate the specific statistic contained in the value of that leaf node. In such an embodiment, the statistics collector 134 may, for example, operate by storing throughput statistic data into leaf nodes of statistics hierarchy 136 having a "THROUGHPUT" type. For example, statistics collector 134 may store throughput statistics data describing the measured throughput of LUN-1 133 into a value of a leaf node having the type "THROUGHPUT", that is a child node of a node in statistics hierarchy 136 representing LUN-1 133. Similarly, statistics collector 134 may store throughput statistics data describing the measured throughput of LUN-2 135 into a value of a leaf node having the type "THROUGHPUT", and that is a child node of a node representing LUN-2 135 in statistics hierarchy 136.

In another example, the statistics collector 134 may store average I/O size statistic data into leaf nodes of statistics hierarchy 136 having an "IOSIZE" type. For example, statistics collector 134 may store average I/O size statistics data describing the average size of I/O operations directed to LUN-1 133 (e.g. each second) into a value of a leaf node having the type "IOSIZE", and that is a child node of a node representing LUN-1 133. Similarly, statistics collector 134 may store average I/O size statistics data describing the average size of I/O operations directed to LUN-2 135 (e.g. each second) into a value of a leaf node having the type "IOSIZE" that is a child node of a node representing LUN-2 135.

Further in the embodiment in which statistics hierarchy 136 is a tree made up of nodes, individual nodes may represent various specific components or functions of the data storage system 116. For example, in an embodiment in which data storage system 116 includes multiple storage processors, each of the storage processors may be represented by a node in statistics hierarchy. Individual data objects served by a given one of the storage processors may be represented by corresponding nodes located under the node representing that storage processor. For example, if LUN-1 133 and LUN-2 135 are served by a storage processor having an identifier of "SP-1", then the nodes for LUN-1 133 and LUN-2 135 (e.g. nodes having labels of "LUN-1" and "LUN-2" respectively) would be located under a node representing SP-1 (e.g. a node with a label "SP-1").

Further during operation of the embodiment shown in FIG. 1, data storage system 116 receives metric requests 150 from a remote device, such as storage administration system 102. Storage administration system 102 is an example of a remote device through which data storage system 116 may be remotely managed by a user, such as a system administrator user. Storage administration system 102 may be made up of or include any specific kind of computer or computer system having one or more processors, program storage (e.g. memory), and one or more communication interfaces. Storage administration system 102 may further include a display device through which a graphical user interface may be displayed that includes graphical representations of statistics data obtained from data storage system 116, and that enables the system administrator to select from among multiple graphical user interface display objects that are operable to cause requests for statistics (e.g. metric requests 150) to be generated and transmitted to data storage system 116. Such a graphical user interface may be provided in storage administration system 102 in whole or part by a storage administration client program executing on storage administration system 102.

Metric requests 150 are received by data storage system 116 through RESTful API 140 provided by statistics service 138. RESTful API 140 conforms to the Representational State Transfer (REST) software architecture style for building scalable web services. Accordingly, RESTful API 140 enables statistics service 138 to communicate using HTTP with the storage administration system 102, and enables storage administration system 102 to issue statistics requests to statistics service 138 using one or more HTTP verbs, such as, for example, GET, POST, PUT, DELETE, etc. Accordingly, each one of metric requests 150 may itself consist of an HTTP (HyperText Transfer Protocol) request. In one embodiment, those of metric requests 150 that request previously collected statistics data stored in statistics hierarchy 136 are issued by storage administration system 102 as HTTP GET requests. Those of metric requests 150 that request statistics data not previously collected and stored by data storage system 116 are issued by storage administration system 102 as HTTP POST requests.

Individual ones of metric requests 150 may include one or more metric paths that describe the statistics that are being requested by the metric request. A metric path contained in a metric request is a delimited list made up of list elements separated by delimiter characters. For example, a metric path contained in one of metric requests 150 may be a text string consisting of text list elements separated by periods, as per the following format:

ListElement1.ListElement2.ListElement3

Each list element in the metric path may indicate a node in the statistics hierarchy 136, or may be a special character. In one embodiment, the special characters that may be list elements in the metric path are single characters, and include an aggregation special character. The disclosed system may alternatively be embodied such that the special characters that may be list elements in the metric path additionally include a list special character. For example, the aggregation special character may consist of a plus sign, i.e. "+", and the list special character may consist of a star character, i.e. "*". Any other specific character may be used in the alternative as either the aggregation special character or the list special character.

During processing of one of the metric requests 150, statistics service 138 checks the metric path contained in metric request for the presence of any list elements that are special characters. Processing of the metric request by statistics service 138 may accordingly include detecting an aggregation special character as a list element in the metric path contained in the metric request. In response to detecting the aggregation special character in the metric path, processing of a metric request by the statistics service 138 may further include obtaining a category name contained in a list element immediately preceding the list element containing the aggregation special character in the metric path. The statistics service 138 then identifies a branch of the statistics hierarchy indicated by the category name. For example, in one embodiment, the category name indicates a category node in the statistics hierarchy, and the branch of the statistics hierarchy indicated by the category name consists of all nodes beneath the category node indicated by the category name.

Further in response to detecting the aggregation special character in the metric path contained in one of the metric requests 150, processing of the metric request includes aggregating the values of those leaf nodes contained in the branch of the statistics hierarchy indicated by the category name that also match a leaf type contained in the metric path, in order to generate an aggregated value. For example, the last list element of the metric path may consist of a leaf type, such as "THROUGHPUT", "IOSIZE", etc. In a case where the leaf type contained in the metric path consists of the "THROUGHPUT" leaf type, the statistics service 138 aggregates the values of the leaf nodes in the indicated branch that have a type of "THROUGHPUT" in order to generate the aggregated value. In a case where the leaf type contained in the metric path consists of the "IOSIZE" leaf type, the statistics service 138 aggregates the values of the leaf nodes in the indicated branch that have a type of "IOSIZE" in order to generate the aggregated value. The statistics service 138 then transmits one of the metric responses 152, containing the aggregated value, to the storage administration server 102. Each of metric responses 152 may, for example, include or consist of an HTTP response message.

Each leaf node in statistics hierarchy 136 may indicate a method to be used to aggregate the value of the leaf node with values of other leaf nodes of the same leaf type. For example, each leaf node in statistics hierarchy 136 may indicate which specific aggregation method is to be used to aggregate the value of the leaf node with values of other leaf nodes of the same type, e.g. either by summing the values, or by averaging the values to generate the aggregated value. Processing the metric request 150 by statistics service 138 in response to detecting the aggregation special character may include detecting that the values of those leaf nodes that i) are contained in the branch of the statistics hierarchy indicated by the category name immediately preceding the aggregation special character in the metric path, and ii) that match the leaf type contained in the metric path (e.g. as the last list element in the metric path), are to be aggregated using a summing aggregation method. In response to detecting that the summing aggregation method is to be used, processing of the metric request by the statistics service 138 includes aggregating the values of those leaf nodes that i) are contained in the branch of the statistics hierarchy indicated by the category name, and ii) that match the leaf type contained in the metric path, by summing the values of those leaf nodes that i) are contained in the branch of the statistics hierarchy indicated by the category name, and ii) that match the leaf type contained in the metric path, in order to generate the aggregated value. In one embodiment, leaf nodes of the "THROUGHPUT" leaf type include an indication that the summing aggregation method is to be used when aggregating the values of leaf nodes of the "THROUGHPUT" leaf type.

Alternatively, processing another of the metric requests 150 by statistics service 138 may include, in response to detecting the aggregation special character, detecting that the values of those leaf nodes that i) are contained in the branch of the statistics hierarchy indicated by the category name immediately preceding the aggregation special character in the metric path, and ii) that match the leaf type contained in the metric path (e.g. as the last list element in the metric path), are to be aggregated using an averaging aggregation method. In response to detecting that the averaging aggregation method is to be used, processing of the metric request by the statistics service 138 includes aggregating the values of those leaf nodes that i) are contained in the branch of the statistics hierarchy indicated by the category name, and ii) that match the leaf type contained in the metric path, by averaging the values of those leaf nodes that i) are contained in the branch of the statistics hierarchy indicated by the category name, and ii) that match the leaf type contained in the metric path, in order to generate the aggregated value. For example, leaf nodes of the "IOSIZE" leaf type may include an indication that the averaging aggregation method is to be used when aggregating the values of leaf nodes of the "IOSIZE" leaf type.

In another example of the operation of the embodiment shown in FIG. 1, processing of another one of the metric requests 150 by statistics service 138 may include detecting a list special character that is an element in a metric path contained in the metric request. In response to detecting the list special character in the metric path, processing of the metric request by statistics service 138 may include obtaining a category name contained in the list element immediately preceding the list special character in the metric path. The statistics service 138 then identifies a branch of the statistics hierarchy indicated by the category name, e.g. all nodes in the statistics hierarchy 136 located below a category node indicated by the category name. Further in response to detecting the list special character in the metric path, processing of the metric request by statistics service 138 may include storing a value of each leaf node contained in the branch of the statistics hierarchy indicated by the category name that also match a leaf type contained in the metric path (e.g. in a last element of the metric path), into an output list. For example, the last list element of the metric path may consist of a leaf type, such as "THROUGHPUT", "IOSIZE", etc. In a case where the leaf type contained in the metric path consists of the "THROUGHPUT" leaf type, the statistics service 138 stores the value of each leaf node in the branch that has a type of "THROUGHPUT" into the output list. Alternatively, in a case where the leaf type contained in the metric path consists of the "IOSIZE" leaf type, the statistics service 138 stores the value of each leaf node in the branch that has a type of "IOSIZE" into the output list. The statistics service 138 then transmits one of metric responses 152 to the storage administration server 102, the metric response containing the output list.

In another example of the operation of the embodiment shown in FIG. 1, processing of another one of metric requests 150 by statistics service 138 may include detecting that a metric path in the metric request ends with a list element that is a category name. In response to detecting that the metric path in the metric request ends with a category name, processing of the metric request may include identifying a branch of the statistics hierarchy indicated by the category name, e.g. all nodes in the statistics hierarchy 136 located below a category node indicated by the category name. Processing of the metric request may further include, in response to detecting that a metric path in the metric request ends with a list element that is a category name, storing a value of each leaf node contained in the branch of the statistics hierarchy into an output list. As the metric path in the metric request ends with a category name, there is no leaf type at the end of the metric path. Accordingly, statistics service 138 may store the value of every leaf node contained in the branch of the statistics hierarchy indicated by the category name into the output list. In this way, values of leaf nodes having different leaf types, albeit located in a single branch of the statistics hierarchy, may be stored into the output list. One of metric responses 152, containing the output list, is then transmitted to the storage administration system 102.

In another example of the operation of the embodiment of the disclosed system shown in FIG. 1, processing of one of the metric requests 150 in the data storage system may include detecting that a metric path contained in the metric request indicates at least one statistic for which historical statistical data is not collected and stored by the data storage system. In one embodiment, an HTTP POST request message is used for such a metric request, i.e. to request that the data storage system begin collecting and storing statistics data for a metric path contained in the metric request that indicates at least one statistic for which data has not previously been collected and stored by the data storage system. Those ones of metric requests 150 that request statistics data previously collected and stored in statistics hierarchy 136, may be issued as HTTP GET requests. In response to a request containing a metric path that indicates at least one statistic for which statistical data has not previously been collected and stored by the data storage system, statistics service 138 causes statistics collector 134 to begin collecting and storing performance data corresponding to the statistic indicated by the metric path. In one embodiment, statistics collector 134 stores the collected data for the new statistic in a cache located in memory 130. Statistics service 138 then transmits one of metric responses 152, containing a query identifier (ID) identifying the newly collected and stored statistics data, to storage administration system 102. Data storage system 116 may subsequently receive, from system administration system 102, another one of metric requests 150 including the query identifier, such as an HTTP GET request message. The statistics service 138 then uses the query identifier to locate the statistics data for the new statistic (e.g. within the cache), and transmits another one of metric responses 152 to storage administration system 102, e.g. an HTTP response message, containing the collected performance data for the new statistic, as identified by the query identifier.

Figure 2:
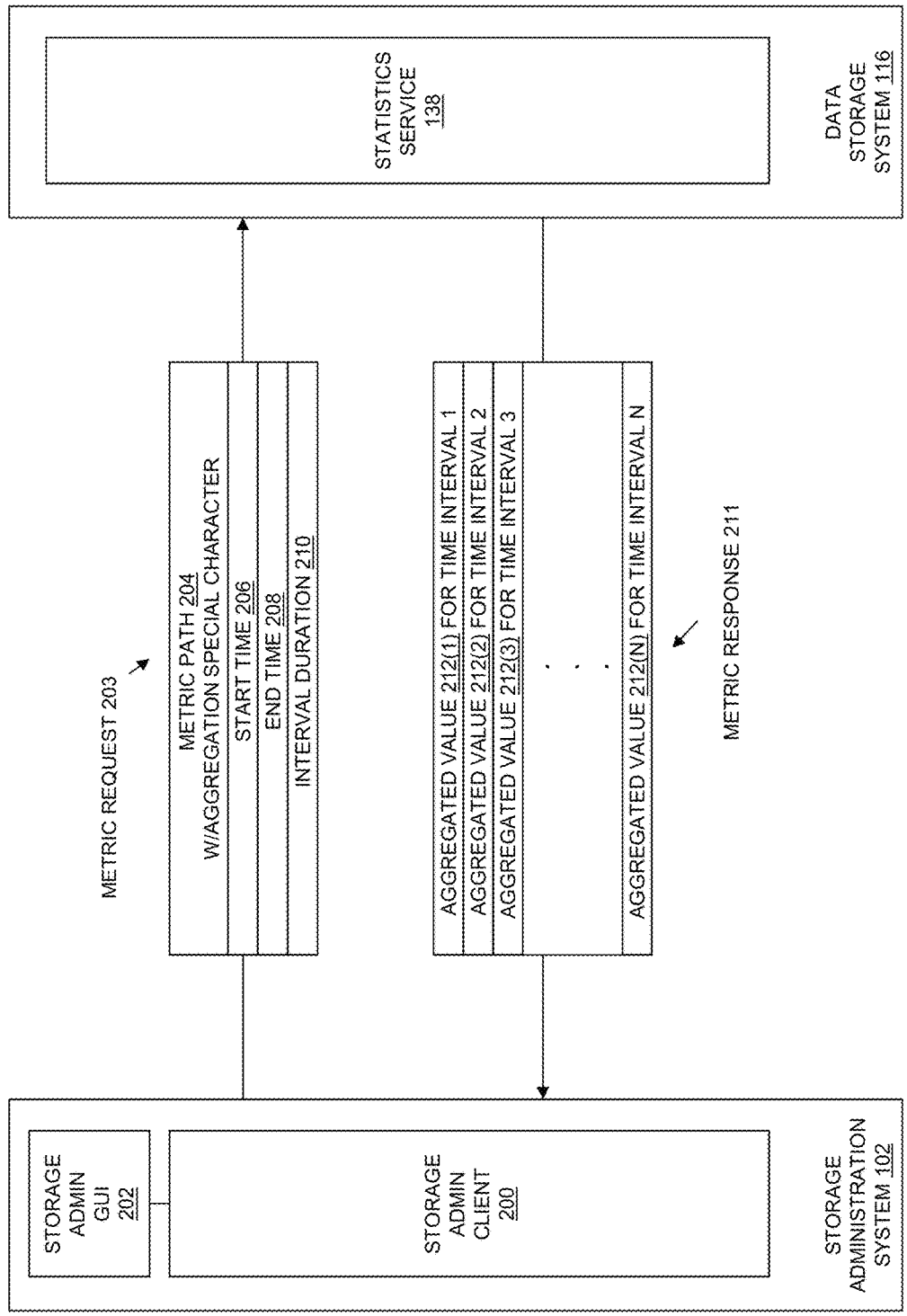
FIG. 2 is a block diagram showing an example of an illustrative embodiment of the disclosed system processing a metric request that includes a metric path having an aggregation special character, by generating a metric response having an aggregated value.

FIG. 2 is a block diagram showing an example of the disclosed system processing a metric request that includes a metric path having an aggregation special character, by generating a metric response having an aggregated value. As shown in FIG. 2, a storage administration client 200 executes on storage administration system 102, and provides a storage administration graphical user interface 202 to a user of storage administration system 102. A metric request 203 includes a metric path 204 that contains an aggregation special character, as well as a start time 206, an end time 208, and an interval duration 210. The metric path 204 indicates the statistics data requested by metric request 203. The start time 206 and end time 208 indicate a preceding time period over which the statistics data indicated by metric path 204 is requested.

Specifically, metric request 203 requests that statistics service 138 return statistics data indicated by metric path 204, with regard to operation of the data storage system 116 over a previous time period beginning at start time 206 and ending at end time 208, and organized into time intervals having a duration indicated by interval 210. For example, in a case where end time 208 indicates a time one hour after start time 206, and interval duration 210 indicates one minute, metric request 203 is requesting the statistical data indicated by metric path 204 for each minute during the hour between start time 206 and end time 208.

For example, metric path 204 may consist of the following delimited list indicating that the metric request 203 is for the aggregation (e.g. sum) of all throughput for all LUNs served by the storage processor SP-A (for each minute during the hour between start time 206 and end time 208):

SP-A.LUN.+.THROUGHPUT

In such a case, statistics service 138 processes metric request 203 by detecting the aggregation special character of "+" in metric path 204. In response to detecting the aggregation special character, statistics service 138 obtains the category name "LUN" contained in the list element immediately preceding the list element containing the aggregation special character in the metric path 204. The statistics service 138 then identifies a branch of the statistics hierarchy indicated by the category name. For example, the category name "LUN" may indicate a category node in the statistics hierarchy, and the branch indicated by the category name "LUN" may consist of the nodes located beneath that category node. The nodes located beneath the category node may consist of nodes representing individual LUNs served by the storage processor SP-A, e.g. a node for LUN-1 133 and a node for LUN-2 135. Beneath each node representing a given one of the LUNs served by the storage processor SP-A are one or more leaf nodes storing statistical data for that LUN. For example, the nodes for LUN-1 133 and LUN-2 135 may each have as a child node a leaf node of the type "THROUGHPUT". The "THROUGHPUT" leaf node that is a child of the node representing LUN-1 133 stores previously collected throughput statistical data (e.g. IOPS) for LUN-1 133, and the "THROUGHPUT" leaf node that is a child node of the node representing LUN-2 135 stores previously collected throughput statistical data (e.g. IOPS) for LUN-2 135.

Further in response to detecting the aggregation special character in the metric path 204 contained in one of the metric request 203, statistics service 138 processes the metric request 203 by aggregating statistical data stored in the values of the leaf nodes contained in the branch of the statistics hierarchy indicated by the category name "LUN", and that also match the leaf type "THROUGHPUT" contained in the metric path, in order to generate an aggregated value. In this case, metric path 203 contains a leaf type of "THOUGHPUT" as the last entry in the metric path. Accordingly, for each one minute interval between start time 206 and end time 208, statistics service 138 aggregates the throughput statistics data stored in the values of the "THROUGHPUT" type leaf nodes beneath the nodes representing LUN-1 133 and LUN-2 135, thus generating aggregated values 212(1) through 212(N), where aggregated value 212(1) is a sum of the throughputs for LUN-1 133 and LUN-2 135 during the first minute of the hour between start time 206 and end time 208, aggregated value 212(2) is a sum of the throughputs for LUN-1 133 and LUN-2 135 during the second minute, aggregated value 212(3) is a sum of the throughputs for LUN-1 133 and LUN-2 135 during the third minute, and so on through aggregated value 212(N), which is the total sum of the throughputs for LUN-1 133 and LUN-2 135 during the last minute of the hour between start time 206 and end time 208. The aggregated values 212(1) through 212(N) are then transmitted in metric response 211 to storage administration system 102. Storage administration client 200 may then cause aggregated values 212(1) through 212(N) to be displayed to a user of storage administration system 102 through storage administration graphical user interface 202.

Figure 3:
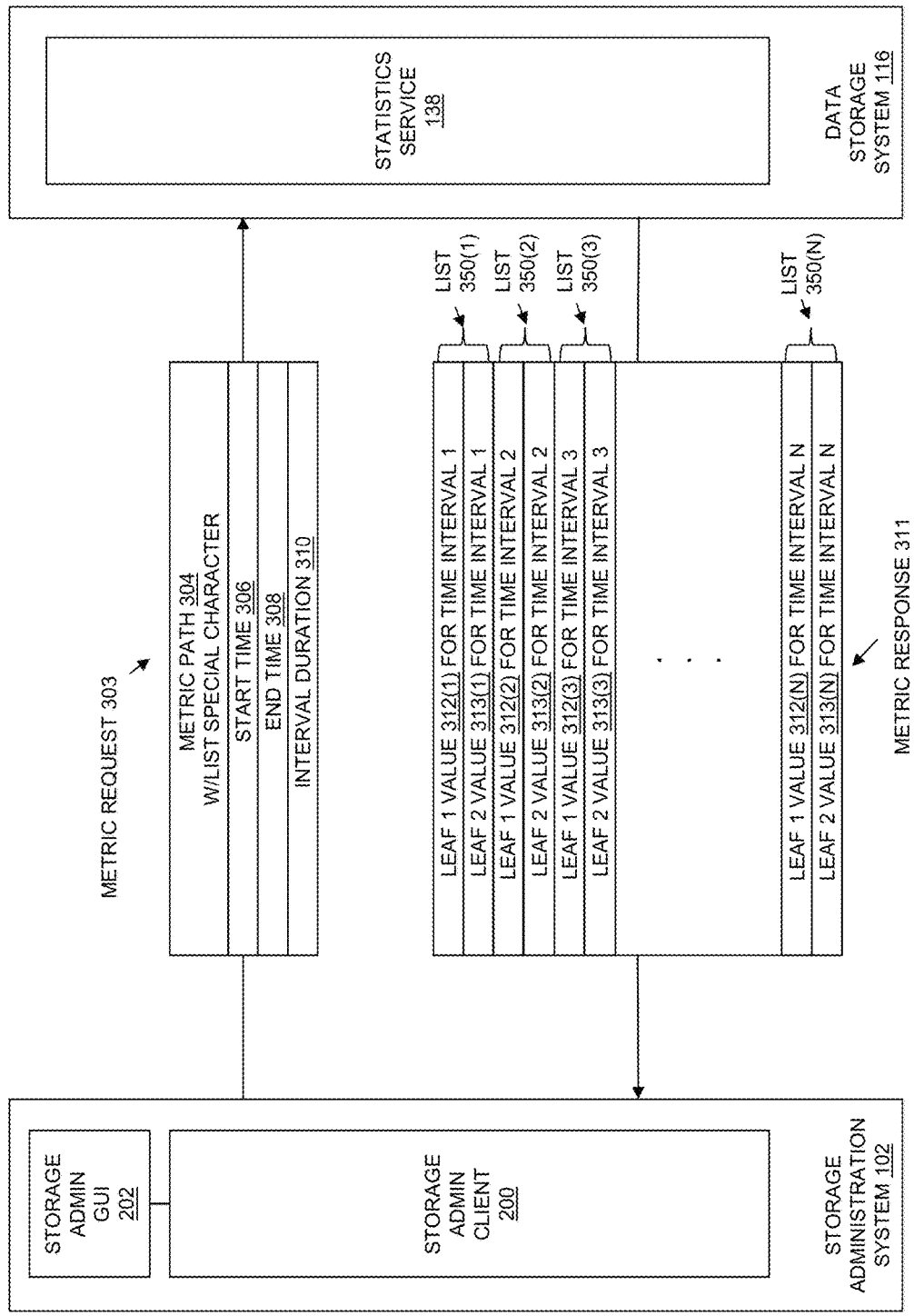
FIG. 3 is a block diagram showing an example of an illustrative embodiment of the disclosed system processing a metric request that includes a metric path having a list special character, by generating a metric response having a list of values of leaf nodes matching a leaf node type in the metric path.

FIG. 3 is a block diagram showing an example of the disclosed system processing a metric request that includes a metric path having a list special character, by generating a metric response having a list of values of leaf nodes that match a leaf node type contained in the metric path. As shown in FIG. 3, a metric request 303 includes a metric path 304 that contains a list special character. Metric request 303 further includes a start time 306, an end time 308, and an interval duration 310. The metric path 304 indicates the statistics data requested by metric request 203. Specifically, metric request 303 requests that statistics service 138 return statistics data indicated by metric path 304, with regard to operation of the data storage system 116 over a previous time period beginning at start time 306 and ending at end time 308, for specific time intervals having a duration indicated by interval 310. For example, in a case where end time 308 indicates a time one hour after start time 306, and interval duration 310 indicates one minute, metric request 303 is requesting statistical data indicated by metric path 304 for each minute during the hour between start time 306 and end time 308.

For example, metric path 304 may consist of the following delimited list indicating that the metric request 303 is for the individual throughput of each LUN served by the storage processor SP-A (for each minute during the hour between start time 206 and end time 208):

SP-A.LUN.*.THROUGHPUT

In such a case, statistics service 138 processes metric request 303 by detecting the list special character of "*" in metric path 304. In response to detecting the list special character, statistics service 138 obtains the category name "LUN" contained in the list element immediately preceding the list element containing the list special character in the metric path 304. The statistics service 138 then identifies a branch of the statistics hierarchy indicated by the category name. For example, the category name "LUN" may indicate a category node in the statistics hierarchy, and the branch indicated by the category name "LUN" may consist of the nodes located beneath that category node. The nodes located beneath the category node may consist of nodes representing individual LUNs served by the storage processor SP-A, e.g. a node for LUN-1 133 and a node for LUN-2 135. Beneath each node representing a given one of the LUNs served by the storage processor SP-A are one or more leaf nodes storing statistical data for that LUN. For example, the nodes for LUN-1 133 and LUN-2 135 may each have as a child a leaf node of the type "THROUGHPUT". The "THROUGHPUT" leaf node that is a child node of the node representing LUN-1 133 stores previously collected throughput statistical data (e.g. IOPS) for LUN-1 133, and the "THROUGHPUT" leaf node that is a child node of the node representing LUN-2 135 stores previously collected throughput statistical data (e.g. IOPS) for LUN-2 135.

Further in response to detecting the list special character in the metric path 304 contained in one of the metric request 303, statistics service 138 processes the metric request 303 by storing the value of each leaf node contained in the branch of the statistics hierarchy indicated by the category name "LUN", and that also has a leaf type matching the leaf type "THROUGHPUT" contained in the metric path, into an output list. In this case, metric path 303 contains a leaf type of "THOUGHPUT" as the last entry in the metric path. Accordingly, for each one minute interval between start time 306 and end time 308, statistics service 138 stores the corresponding throughput statistics data from the leaf nodes having a "THROUGHPUT" leaf type beneath the nodes representing LUN-1 133 and LUN-2 135 into a corresponding one of the output lists 350(1) through 350(N). For example, each one of output lists 350(1) through 350(N) corresponds to one of the minutes during the hour between start time 306 and end time 308, and contains a leaf 1 value 312 that stores the throughput for LUN-1 133 for that minute, and a leaf 2 value 313 that stores the throughput for LUN-2 135 during that minute. Specifically, leaf 1 value 312(1) contains the throughput for LUN-1 133 and leaf 2 value 313(1) contains the throughput for LUN-2 135 for the first minute, leaf 1 value 312(2) contains the throughput for LUN-1 133 and leaf 2 value 313(2) contains the throughput for LUN-2 135 during the second minute, leaf 1 value 312(3) contains the throughput for LUN-1 133 and leaf 2 value 313(3) contains the throughput for LUN-2 135 during the third minute, and so on through leaf 1 value 312(N) that contains the throughput for LUN-1 133 and leaf 2 value 313(N) contains the throughput for LUN-2 135 during the last minute between start time 306 and end time 308. The output lists 350(1) through 350(N) are then transmitted in metric response 311 to storage administration system 102. Storage administration client 200 may then cause output lists 350(1) through 350(N) to be displayed to a user of storage administration system 102 through storage administration graphical user interface 202.

Figure 4:
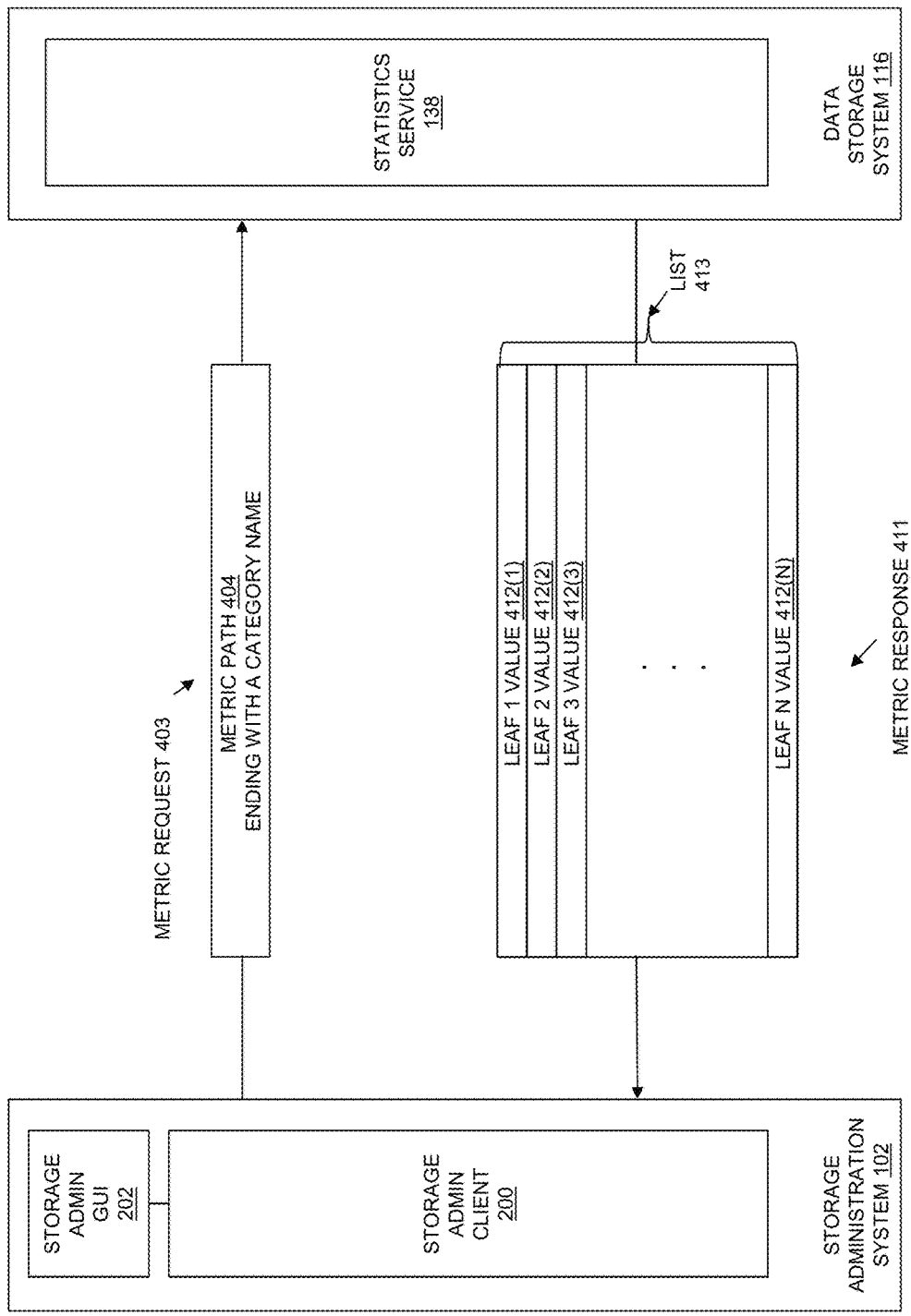
FIG. 4 is a block diagram showing an example of an illustrative embodiment of the disclosed system processing a metric request that includes a metric path ending with a category name, by generating a metric response having a list of values of all leaf nodes in the branch indicated by the category name at the end of the metric path.

FIG. 4 is a block diagram showing an example of the disclosed system processing a metric request including a metric path ending with a category name by generating a metric response having a list of values of all leaf nodes in the branch indicated by the category name at the end of the metric path, regardless of leaf node type. In the example of FIG. 4, a metric request 403 includes a metric path 404 that ends with a category name. Metric request 403 may further include a start time, end time, and duration, as shown in and described above with reference to the metric requests of examples of FIG. 2.

As shown for purposes of illustration in FIG. 4, metric path 404 may consist of the following delimited list indicating that the metric request 403 is for all types of statistical data (i.e. values from all types of leaf nodes) stored for each LUN served by the storage processor SP-A:

SP-A.LUN

In such a case, statistics service 138 processes metric request 403 by detecting that metric path 404 ends with the category name "LUN". In response to detecting that the metric path 404 ends with the category name "LUN", statistics service 138 processes the metric request by identifying a branch of the statistics hierarchy indicated by the category name "LUN", e.g. all nodes in the statistics hierarchy 136 located below a category node indicated by the category name "LUN", that itself is located under a node representing storage processor "SP-A". Processing of the metric request 403 by statistics service 138 further includes storing statistics data stored in each value of each leaf node contained in the branch of the statistics hierarchy indicated by the category name "LUN" into the output list 413. Since the metric path 404 in the metric request 403 ends with a category name, there is no leaf type at the end of the metric path. Accordingly, statistics service 138 stores statistics data from the values of all leaf nodes contained in the branch of the statistics hierarchy indicated by the category name "LUN" into the output list 413. In this way, statistics service 138 processes metrics request 403 by storing all types of statistics that are collected and stored for all LUNs that are served by the storage processor "SP-A" into output list 413.

Specifically, as shown in the example of FIG. 4, if there are "N" leaf nodes contained in the branch of the statistics hierarchy indicated by the category name "LUN", then statistics service 138 stores the statistics contained in the values of each of the N leaf nodes into the output list 413. Accordingly, in the current example in which metric path 404 consists of "SP-A.LUN," output list 413 may include multiple different types of statistics for the LUNs served by storage processor "SP-A", and consist of leaf 1 value 412(1), leaf 2 value 412(2), leaf 3 value 412(3), and so on through leaf N value 412(N).

For example, the nodes located beneath the category node indicated by category name "LUN" may consist of nodes representing each of the individual LUNs served by the storage processor "SP-A", e.g. a node for LUN-1 133 and a node for LUN-2 135 as shown in FIG. 1. Beneath each node representing a given one of the LUNs served by the storage processor "SP-A" are one or more leaf nodes storing statistical data for that LUN. For example, nodes for LUN-1 133 and LUN-2 135 may each have as child nodes a leaf node of the type "THROUGHPUT", and a leaf node of the type "IOSIZE". In such a case, output list 413 would contain statistics from the values of all of the leaf nodes under the nodes for LUN-1 133 and LUN-2 135, and accordingly would contain both throughput and average I/O size statistics for each of LUN-1 133 and LUN-2 135.

Figure 5:
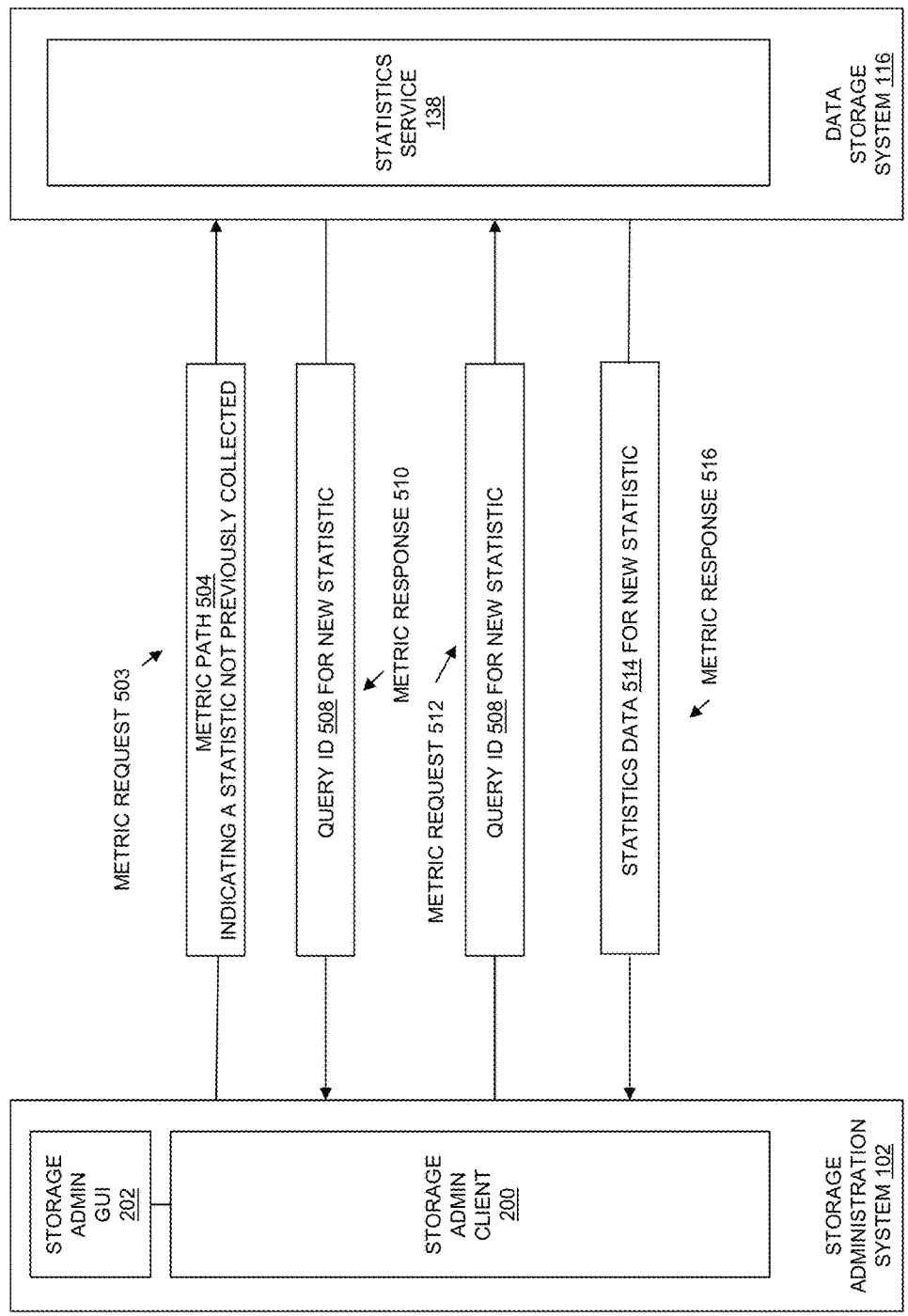
FIG. 5 is a block diagram showing an example of an embodiment of the disclosed system processing a metric request that includes a metric path indicating a metric that was not previously collected and stored by the data storage system.

FIG. 5 is a block diagram showing an example of an embodiment of the disclosed system processing a metric request for statistical data that has not previously been collected and stored by the data storage system. As shown in FIG. 5, metric request 503 includes a metric path 504 that indicates at least one statistic for which statistical data has not previously been collected and stored by the data storage system 116. Metric request 503 may, for example, be an HTTP POST request message requesting that the data storage system 116 begin collecting and storing statistics data indicated by metric path 504. In response to a metric request 503, statistics service 138 causes statistics collector 134 (FIG. 1) to begin collecting and storing performance data corresponding to the statistic indicated by the metric path 504. Statistics service 138 then transmits metric response 510, containing a query identifier (ID) 508 identifying the newly collected and stored statistics data, to storage administration system 102. Data storage system 116 may subsequently receive, from system administration system 102, a metric request 512 (e.g. an HTTP GET request message) including the query identifier 508. The statistics service 138 then uses the query identifier to locate the statistics data for the new statistic (e.g. within a cache in data storage system 116), and transmits metric response 516 to storage administration system 102, containing the collected performance data 514 for the new statistic, as identified by the query identifier 508.

Figure 6:
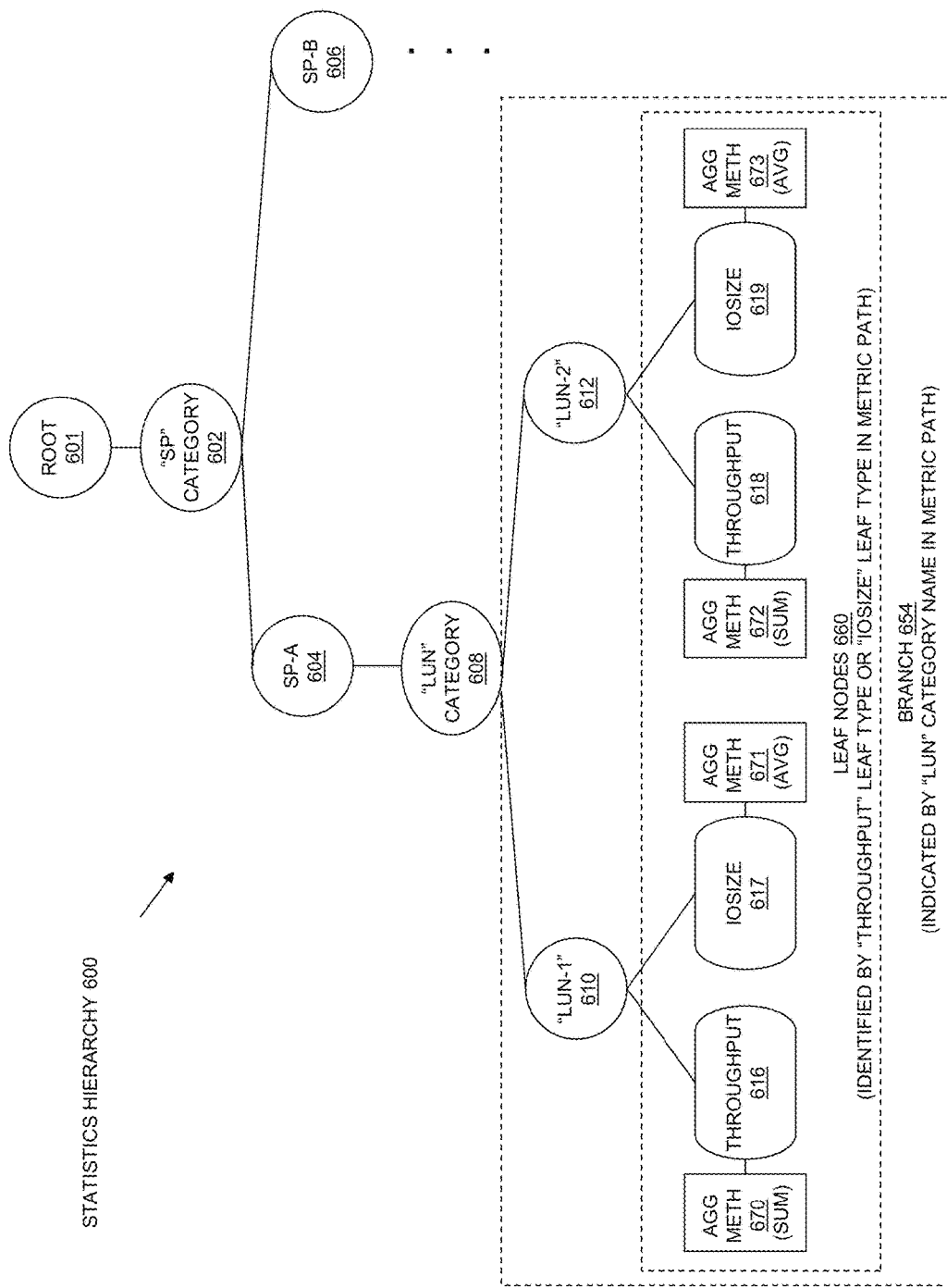
FIG. 6 is a block diagram showing a simplified example of a storage hierarchy generated by an embodiment of the disclosed system.

FIG. 6 is a block diagram showing a simplified example of a storage hierarchy generated by an embodiment of the disclosed system. The statistics hierarchy 600 shown in FIG. 6 is a simplified example of statistics hierarchy 136 shown in FIG. 1. As shown in FIG. 6, the nodes of statistics hierarchy 600 include a root node 601, under which is an "SP" ("storage processor") category node 602. Under "SP" category node 602 are nodes for each storage processor in the data storage system, for example, a first node "SP-A" 604 for a first storage processor, and a second node "SP-B" 606 for a second storage processor. The sub-tree located under node "SP-A" 604 includes nodes associated with the components and/or operation of storage processor "SP-A", and the sub-tree located under node "SP-B" 606 includes nodes associated with the components and/or operation of storage processor "SP-B". For purposes of concise illustration only an example of nodes contained in the sub-tree located under node "SP-A" 604 are shown in FIG. 6.

A "LUN" category node 608 is shown under node "SP-A" 604. The "LUN" category node 608 may be indicated by a category name of "LUN" in a metric path. The branch 654 consists of all nodes beneath "LUN" category node 608, and accordingly branch 654 is the branch of statistics hierarchy 600 indicated by the "LUN" category name in the following example metric paths:

SP-A.LUN.+.THROUGHPUT
SP-A.LUN.*.THROUGHPUT
SP-A.LUN.*.IOSIZE
SP-A.LUN.+.IOSIZE
SP-A.LUN

Further in the example of FIG. 6, the nodes located beneath the "LUN" category node 608 consist of nodes representing individual LUNs served by the storage processor SP-A, e.g. a node "LUN-1" 610 for LUN-1 133 shown in FIG. 1, and a node "LUN-2" 612 for LUN-2 135 shown in FIG. 1. Beneath each node representing a given one of the LUNs served by the storage processor SP-A are leaf nodes storing statistical data for the respective LUN. For example, the nodes "LUN-1" 610 and "LUN-2" 612 each have child leaf nodes of the type "THROUGHPUT" and of the type "IOSIZE". Specifically, node "LUN-1" 610 has a child leaf node 616 of the "THOUGHPUT" leaf type and a child leaf node 617 of the "IOSIZE" leaf type, and node "LUN-2" 612 has a child leaf node 618 of the "THROUGHPUT" leaf type and a child leaf node 619 of the "IOSIZE" leaf type. A value of the "THROUGHPUT" leaf node 616 stores throughput statistical data regarding previous I/O operations directed to LUN-1 133, and a value of the "IOSIZE" leaf node 617 stores average I/O size statistical data regarding previous I/O operations directed to LUN-1 133. A value of the "THROUGHPUT" leaf node 618 stores throughput statistical data regarding previous I/O operations directed to LUN-2 135, and a value of the "IOSIZE" leaf node 619 stores average I/O size statistical data regarding previous I/O operations directed to LUN-1 135. The "THROUGHPUT"

leaf nodes 616 and 618 are identified by the "THROUGHPUT" leaf types contained in the following example metric paths:

SP-A.LUN.+.THROUGHPUT
SP-A.LUN.*.THROUGHPUT

The "IOSIZE" leaf nodes 617 and 619 are identified by the "IOSIZE" leaf types contained in the following example metric paths:

SP-A.LUN.*.IOSIZE
SP-A.LUN.+.IOSIZE

Each of the leaf nodes in FIG. 6 indicates a method by which its value is to be aggregated with the values of other leaf nodes of the same type. "THROUGHPUT" leaf node 616 indicates aggregation method 670 (aggregation by summing), "THROUGHPUT" leaf node 618 indicates aggregation method 672 (aggregation by summing), "IOSIZE" leaf node 617 indicates aggregation method 671 (aggregation by averaging), and "IOSIZE" leaf node 619 indicates aggregation method 673 (aggregation by averaging).

Figure 7:
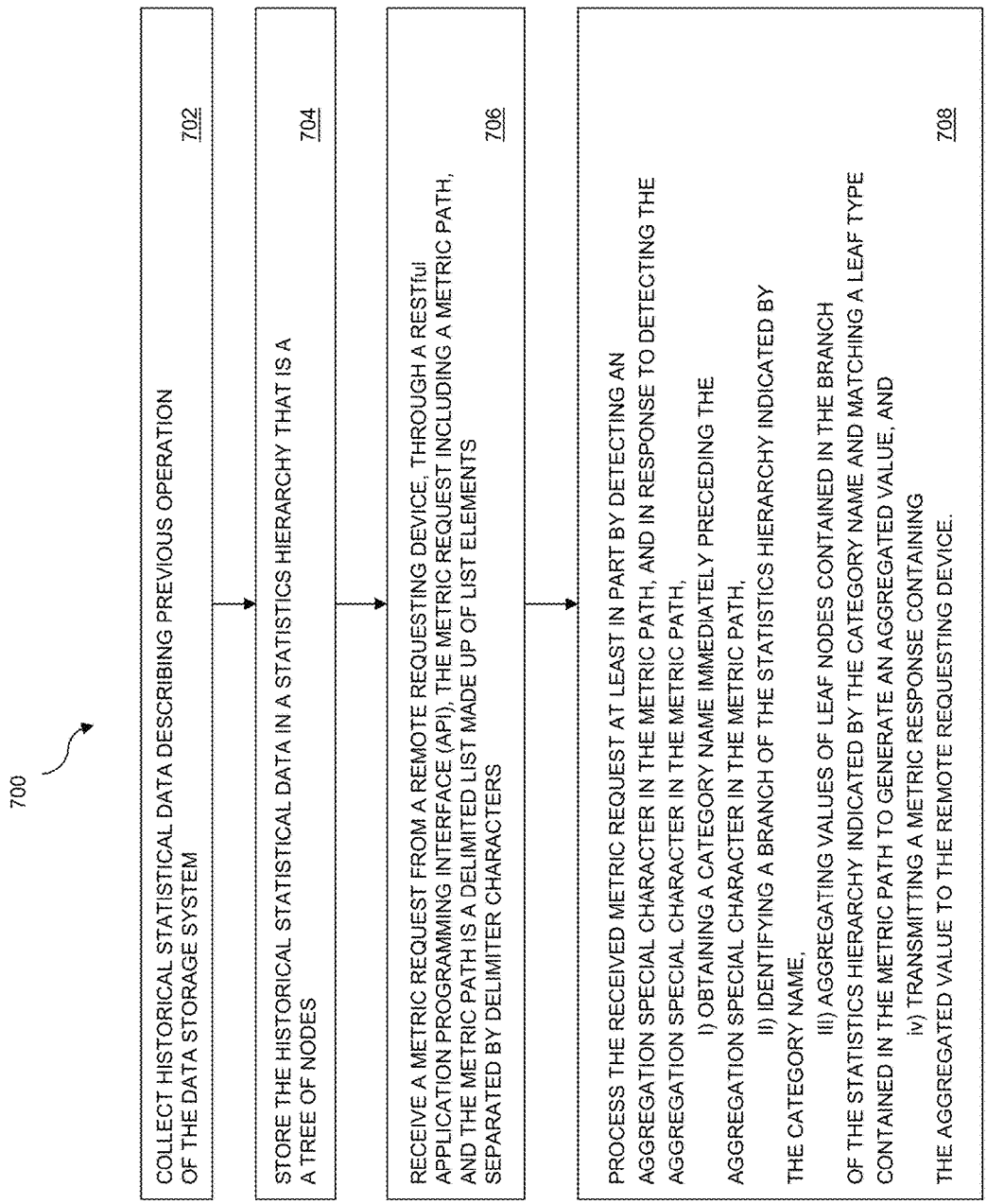
FIG. 7 is a flow chart showing an example of a process for providing access to statistical data of a data storage system using the disclosed system.

FIG. 7 is a flow chart showing an example of a process for providing access to statistical data of a data storage system using the disclosed system. As shown in FIG. 7, at step 702 the disclosed system collects historical statistical data describing previous operations of the data storage system. At step 704, the disclosed system stores the collected historical statistical data into a statistics hierarchy that is a tree of nodes. At step 706, the disclosed system receives a metric request from a remote requesting device, through a RESTful application programming interface (API). The metric request includes a metric path, and the metric path is a delimited list made up of list elements separated by delimiter characters.

At step 708 the disclosed system processes the received metric request, at least in part by detecting an aggregation special character in the metric path, and in response to detecting the aggregation special character in the metric path, i) obtaining a category name immediately preceding the aggregation special character in the metric path, ii) identifying a branch of the statistics hierarchy indicated by the category name, iii) aggregating values of leaf nodes contained in the branch of the statistics hierarchy indicated by the category name and matching a leaf type contained in the metric path to generate an aggregated value, and iv) transmitting a metric response containing the aggregated value to the remote requesting device.

Figure 8:
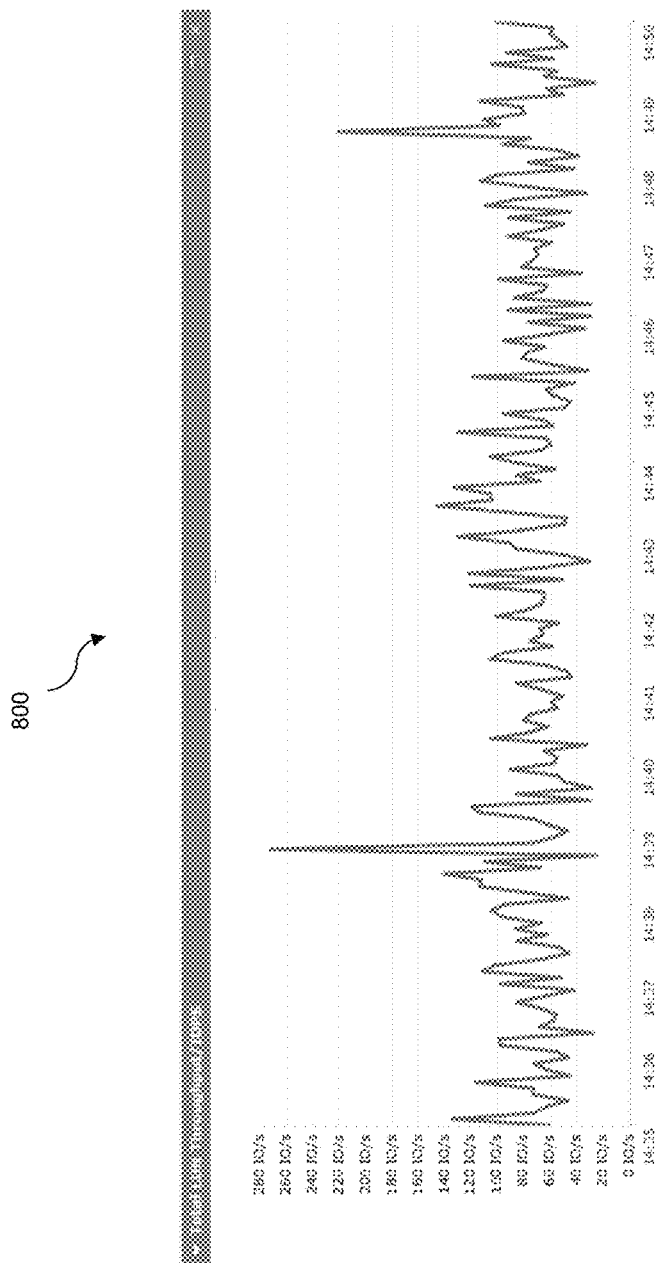
FIG. 8 shows an example of a portion of a graphical user interface for displaying statistical data obtained using the disclosed system to a user, as provided by a storage administration system.

FIG. 8 shows an example of a portion of a graphical user interface for displaying statistical data obtained using the disclosed system to a user, as provided by a storage administration system. The graph 800 shown in FIG. 8 is an example of how data obtained through the disclosed system may be displayed to a storage administration user at a remote storage administration system 102, for example as part of the storage administration graphical user interface 202 shown in FIGS. 2-5. In the example of FIG. 8, the graph 800 shows the total aggregated throughput for all LUNs served by a storage processor, in terms of I/Os per second (IOPS). Accordingly, the graph 800 may, for example, be a display of data obtained from an embodiment of the disclosed system using a metrics request including the following metric path:

SP-A.LUN.+.THROUGHPUT

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of providing access to statistical data of a data storage system, comprising executing, on at least one processor of the data storage system, the steps of:
   collecting historical statistical data describing previous operation of the data storage system;
   storing the historical statistical data in a statistics hierarchy, wherein the statistics hierarchy comprises a tree of nodes, wherein the historical statistical data is stored in leaf nodes of the tree of nodes, and wherein each leaf node in the tree of nodes has a corresponding leaf type;
   receiving, from a remote requesting device through an application programming interface in the data storage system, a metric request, wherein the metric request includes a metric path, wherein the metric path comprises a delimited list of elements separated by delimiter characters, and wherein the metric path contains a leaf type; and
   processing the received metric request at least in part by
      detecting an aggregation special character in the metric path, and
      in response to detecting the aggregation special character in the metric path, i) obtaining a category name immediately preceding the aggregation special character in the metric path, wherein the category name indicates a category node in the statistics hierarchy, ii) identifying a branch of the statistics hierarchy indicated by the category name, wherein the branch of the statistics hierarchy indicated by the category name consists of all nodes in the statistics hierarchy beneath the category node indicated by the category name, iii) aggregating the values of those leaf nodes contained in the branch of the statistics hierarchy indicated by the category name that also match the leaf type contained in the metric path to generate an aggregated value, and iv) transmitting a metric response containing the aggregated value to the remote requesting device.

2. The method of claim 1, wherein each leaf node in the statistics hierarchy indicates whether the value of the leaf node must be aggregated with values of other leaf nodes of the same type by summing or by averaging, and wherein processing the received metric request in response to detecting the aggregation special character further includes:
   detecting that the leaf nodes that are contained in the branch of the statistics hierarchy indicated by the category name, and that also match the leaf type contained in the metric path, indicate that the values of the leaf nodes that are contained in the branch of the statistics hierarchy indicated by the category name, and that also match the leaf type contained in the metric path, must be aggregated with values of other leaf nodes of the same type by summing; and
   wherein aggregating the values of the leaf nodes that are contained in the branch of the statistics hierarchy indicated by the category name, and that also match the leaf type contained in the metric path, comprises summing the values of the leaf nodes that are contained in the branch of the statistics hierarchy indicated by the category name, and that also match the leaf type contained in the metric path, to generate the aggregated value.

3. The method of claim 1, wherein each leaf node in the statistics hierarchy indicates whether the value of the leaf node must be aggregated with values of other leaf nodes of the same type by summing or by averaging, and wherein processing the received metric request in response to detecting the aggregation special character further includes:
   detecting that the leaf nodes that are contained in the branch of the statistics hierarchy indicated by the category name, and that also match the leaf type contained in the metric path, indicate that the values of the leaf nodes that are contained in the branch of the statistics hierarchy indicated by the category name, and that also match the leaf type contained in the metric path, must be aggregated with values of other leaf nodes of the same type by averaging; and
   wherein aggregating the values of the leaf nodes that are contained in the branch of the statistics hierarchy indicated by the category name, and that also match the leaf type contained in the metric path comprises averaging the values of the leaf nodes that are contained in the branch of the statistics hierarchy indicated by the category name, and that also match the leaf type contained in the metric path, to generate the aggregated value.

4. The method of claim 2, further comprising:
   receiving, from the remote requesting device through the application programming interface in the data storage system, a second metric request, the second metric request including a second metric path, wherein the second metric path comprises a delimited list of elements separated by delimiter characters; and
   processing the second received metric request in the data storage system by
      detecting a list special character in the second metric path,
      in response to detecting the list special character in the metric path, i) obtaining a second category name immediately preceding the list special character in the second metric path, ii) identifying a second branch of the statistics hierarchy indicated by the second category name, iii) storing a value of each leaf node that is contained in the second branch of the statistics hierarchy, and that also matches a leaf type contained in the metric path, into an output list, and iv) transmitting a second metric response containing the output list to the remote requesting device.

5. The method of claim 4, further comprising:
   receiving, through the application programming interface in the data storage system from the remote requesting device, a third metric request, the third metric request including a third metric path, wherein the third metric path comprises a delimited list of elements separated by delimiter characters; and
   processing the third received metric request in the data storage system by
      detecting that the third metric path ends with a third category name, and
      in response to detecting that the third metric path ends with a third category name, i) identifying a third branch of the statistics hierarchy indicated by the third category name, ii) storing a value of each leaf node contained in the third branch of the statistics hierarchy into a second output list, and iii) transmitting a third metric response containing the second output list to the remote requesting device.

6. The method of claim 5, further comprising:
receiving, through the application programming interface in the data storage system from the remote requesting device, a fourth metric request, the fourth metric request including a fourth metric path, wherein the fourth metric path comprises a delimited list of elements separated by delimiter characters;
processing the fourth received metric request in the data storage system by
detecting that the fourth metric path indicates at least one statistic for which statistical data was not previously maintained by the data storage system, and
in response to detecting that the fourth metric path indicates at least one statistic for which statistical data was not previously maintained by the data storage system, i) causing the data storage system to begin to collect performance data corresponding to the statistic indicated by the fourth metric path, ii) storing the collected performance data corresponding to the statistic indicated by the fourth metric path in the data storage system, and iii) transmitting a fourth metric response containing a query identifier (ID) identifying the statistic indicated by the fourth metric path to the remote requesting device;
receiving, through the application programming interface in the data storage system from the remote requesting device, a fifth metric request, the fifth metric request including the query identifier (ID) identifying the statistic indicated by the fourth metric path; and
processing the fifth received metric request in the data storage system by i) identifying the collected performance data for the statistic indicated by the fourth metric path based on the query identifier, and ii) transmitting, to the remote requesting device, a fifth metric response, the fifth metric response containing the collected performance data for the statistic indicated by the fourth metric path.

7. The method of claim 1, wherein the category name immediately preceding the aggregation special character in the metric path comprises a logical unit category name; and
wherein the branch of the statistics hierarchy indicated by the category name immediately preceding the aggregation special character in the metric path comprises i) nodes that are located beneath the category node indicated by the category name and that represent individual logical units that are contained in the data storage system, and ii) leaf nodes that are located beneath the nodes that represent logical units that are contained in the data storage system, wherein the leaf nodes store statistical data for respective ones of the logical units.

8. The method of claim 7, wherein aggregating the values of those leaf nodes contained in the branch of the statistics hierarchy indicated by the category name that also match the leaf type contained in the metric path comprises summing the values that are stored in the leaf nodes that are located beneath the nodes representing the logical units that are contained in the data storage system.

9. The method of claim 7, wherein aggregating the values of those leaf nodes contained in the branch of the statistics hierarchy indicated by the category name that also match the leaf type contained in the metric path comprises averaging the values that are stored in the leaf nodes that are located beneath the nodes representing the logical units that are contained in the data storage system.

10. A data storage system, comprising control circuitry that includes processing circuitry coupled to a memory, the control circuitry constructed and arranged to:
collect historical statistical data describing previous operation of the data storage system;
store the historical statistical data in a statistics hierarchy, wherein the statistics hierarchy comprises a tree of nodes, wherein the historical statistical data is stored in leaf nodes of the tree of nodes, and wherein each leaf node in the tree of nodes has a corresponding leaf type;
receive, from a remote requesting device through an application programming interface in the data storage system, a metric request, wherein the metric request includes a metric path, wherein the metric path comprises a delimited list of elements separated by delimiter characters, and wherein the metric path contains a leaf type; and
process the received metric request at least in part by
detecting an aggregation special character in the metric path, and
in response to detecting the aggregation special character in the metric path, i) obtaining a category name immediately preceding the aggregation special character in the metric path, wherein the category name indicates a category node in the statistics hierarchy, ii) identifying a branch of the statistics hierarchy indicated by the category name, wherein the branch of the statistics hierarchy indicated by the category name consists of all nodes in the statistics hierarchy beneath the category node indicated by the category name, iii) aggregating the values of those leaf nodes that are contained in the branch of the statistics hierarchy indicated by the category name that also match the fall leaf type contained in the metric path to generate an aggregated value, and iv) transmitting a metric response containing the aggregated value to the remote requesting device.

11. The data storage system of claim 10, wherein each leaf node in the statistics hierarchy indicates whether the value of the leaf node must be aggregated with values of other leaf nodes of the same type by summing or by averaging, and wherein the control circuitry is further constructed and arranged to process the received metric request in response to detecting the aggregation special character by:
detecting that the leaf nodes that are contained in the branch of the statistics hierarchy indicated by the category name, and that also match the leaf type contained in the metric path, indicate that the values of the leaf nodes that are contained in the branch of the statistics hierarchy indicated by the category name, and that also match the leaf type contained in the metric path, must be aggregated with values of other leaf nodes of the same type by summing; and
wherein aggregating the values of the leaf nodes that are contained in the branch of the statistics hierarchy indicated by the category name, and that also match the leaf type contained in the metric path, comprises summing the values of the leaf nodes that are contained in the branch of the statistics hierarchy indicated by the category name, and that also match the leaf type contained in the metric path, to generate the aggregated value.

12. The data storage system of claim 10, wherein each leaf node in the statistics hierarchy indicates whether the value of the leaf node must be aggregated with values of other leaf nodes of the same type by summing or by averaging, and wherein the control circuitry is further constructed and arranged to process the received metric request in response to detecting the aggregation special character by:
  detecting that the leaf nodes that are contained in the branch of the statistics hierarchy indicated by the category name, and that also match the leaf type contained in the metric path, indicate that the values of the leaf nodes that are contained in the branch of the statistics hierarchy indicated by the category name, and that also match the leaf type contained in the metric path, must be aggregated with values of other leaf nodes of the same type by averaging; and
  wherein aggregating the values of the leaf nodes that are contained in the branch of the statistics hierarchy indicated by the category name, and that also match the leaf type contained in the metric path comprises averaging the values of the leaf nodes that are contained in the branch of the statistics hierarchy indicated by the category name, and that also match the leaf type contained in the metric path, to generate the aggregated value.

13. The data storage system of claim 11, wherein the control circuitry is further constructed and arranged to:
  receive, from the remote requesting device through the application programming interface in the data storage system, a second metric request, the second metric request including a second metric path, wherein the second metric path comprises a delimited list of elements separated by delimiter characters; and
  process the second received metric request in the data storage system by
    detecting a list special character in the second metric path,
    in response to detecting the list special character in the metric path, i) obtaining a second category name immediately preceding the list special character in the second metric path, ii) identifying a second branch of the statistics hierarchy indicated by the second category name, iii) storing a value of each leaf node that is contained in the second branch of the statistics hierarchy, and that also matches a leaf type contained in the metric path, into an output list, and iv) transmitting a second metric response containing the output list to the remote requesting device.

14. The data storage system of claim 13, wherein the control circuitry is further constructed and arranged to:
  receive, through the application programming interface in the data storage system from the remote requesting device, a third metric request, the third metric request including a third metric path, wherein the third metric path comprises a delimited list of elements separated by delimiter characters; and
  process the third received metric request in the data storage system by
    detecting that the third metric path ends with a third category name, and
    in response to detecting that the third metric path ends with a third category name, i) identifying a third branch of the statistics hierarchy indicated by the third category name, ii) storing a value of each leaf node contained in the third branch of the statistics hierarchy into a second output list, and iii) transmitting a third metric response containing the second output list to the remote requesting device.

15. The data storage system of claim 14, wherein the control circuitry is further constructed and arranged to:
  receive, through the application programming interface in the data storage system from the remote requesting device, a fourth metric request, the fourth metric request including a fourth metric path, wherein the fourth metric path comprises a delimited list of elements separated by delimiter characters;
  process the fourth received metric request in the data storage system by
    detecting that the fourth metric path indicates at least one statistic for which statistical data was not previously maintained by the data storage system, and
    in response to detecting that the fourth metric path indicates at least one statistic for which statistical data was not previously maintained by the data storage system, i) causing the data storage system to begin to collect performance data corresponding to the statistic indicated by the fourth metric path, ii) storing the collected performance data corresponding to the statistic indicated by the fourth metric path in the data storage system, and iii) transmitting a fourth metric response containing a query identifier (ID) identifying the statistic indicated by the fourth metric path to the remote requesting device;
  receive, through the application programming interface in the data storage system from the remote requesting device, a fifth metric request, the fifth metric request including the query identifier (ID) identifying the statistic indicated by the fourth metric path; and
  process the fifth received metric request in the data storage system by i) identifying the collected performance data for the statistic indicated by the fourth metric path based on the query identifier, and ii) transmitting, to the remote requesting device, a fifth metric response, the fifth metric response containing the collected performance data for the statistic indicated by the fourth metric path.

16. A computer program product including a set of non-transitory, computer-readable media having instructions which, when executed by control circuitry of a data storage system, cause the control circuitry to perform a method of providing access to statistical data of the data storage system, the method comprising:
  collecting historical statistical data describing previous operation of the data storage system;
  storing the historical statistical data in a statistics hierarchy, wherein the statistics hierarchy comprises a tree of nodes, wherein the historical statistical data is stored in leaf nodes of the tree of nodes, and wherein each leaf node in the tree of nodes has a corresponding leaf type;
  receiving, from a remote requesting device through an application programming interface in the data storage system, a metric request, wherein the metric request includes a metric path, wherein the metric path comprises a delimited list of elements separated by delimiter characters, and wherein the metric path contains a leaf type; and
  processing the received metric request at least in part by
    detecting an aggregation special character in the metric path, and
    in response to detecting the aggregation special character in the metric path, i) obtaining a category name immediately preceding the aggregation special character in the metric path, wherein the category name indicates a category node in the statistics hierarchy, ii) identifying a branch of the statistics hierarchy indicated by the category name, wherein the branch of the statistics hierarchy indicated by the category name consists of all nodes in the statistics hierarchy beneath the category node indicated by the category name, iii) aggregating the values of leaf nodes that are contained in the branch of the statistics hierarchy indicated by the category name that also match the leaf type contained in the metric path to generate an aggregated value, and iv) transmitting a metric response containing the aggregated value to the remote requesting device.

* * * * *